United States Patent [19]
Wiseman et al.

[11] Patent Number: 5,802,317
[45] Date of Patent: Sep. 1, 1998

[54] ELECTRONIC CIRCUIT HAVING PHASED LOGIC BUSSES FOR REDUCING ELECTROMAGNETIC INTERFERENCE

[75] Inventors: Carl Donald Wiseman; Naji Chafic Naufel; Sang Quan; Yong Hyon Kim, all of Austin, Tex.

[73] Assignee: Motorola, Inc., Schaumburg, Ill.

[21] Appl. No.: 707,675

[22] Filed: Sep. 4, 1996

[51] Int. Cl.$^6$ .................. G06F 13/14; G06F 1/04
[52] U.S. Cl. .................. 395/280; 395/551; 395/559
[58] Field of Search .................. 395/183.19, 185.09, 395/280, 306, 551, 559; 326/86, 21, 26

[56] References Cited

U.S. PATENT DOCUMENTS

| | | | |
|---|---|---|---|
| 4,956,850 | 9/1990 | Balmer | 375/3 |
| 5,248,047 | 9/1993 | Spohrer | 307/246 |
| 5,311,081 | 5/1994 | Donaldson et al. | 307/475 |
| 5,532,630 | 7/1996 | Waggoner et al. | 327/108 |
| 5,594,370 | 1/1997 | Nguyen et al. | 326/86 |
| 5,640,547 | 6/1997 | Hotta et al. | 395/555 |
| 5,648,931 | 7/1997 | Obara | 365/189.05 |
| 5,657,456 | 8/1997 | Gist et al. | 395/280 |
| 5,687,330 | 11/1997 | Gist et al. | 395/309 |

Primary Examiner—Meng-Ai T. An
Assistant Examiner—Xuan M. Thai
Attorney, Agent, or Firm—James A. Lamb

[57] ABSTRACT

An electronic circuit (100) for reducing electromagnetic interference includes a plurality of circuit elements (130, 140, 150) to which a set of bussed logic signals (343) generated by a set of first circuits (342) is distributed by a logic clock (120). The electronic circuit (100) further includes a plurality of cascaded busses (355, 135, 335) including a last cascaded bus (335) having a last enablement phase. Each of the plurality of cascaded busses (355, 135, 335) couples a set of amplified logic signals (355, 135, 335) from one of the plurality of circuit elements (358, 359, 336) to another one of the plurality of circuit elements (359, 336, 322). The set of amplified logic signals (355, 135, 335) of each of the plurality of cascaded busses is enabled during an enable period (351, 352, 330) which lasts beyond an end of the last enablement phase.

18 Claims, 4 Drawing Sheets

ELECTRONIC CIRCUIT HAVING PHASED LOGIC BUSSES FOR REDUCING ELECTROMAGNETIC INTERFERENCE

FIELD OF THE INVENTION

This invention relates in general to electronic circuits having devices coupled by logic busses, and in particular to a phased technique of driving the busses.

BACKGROUND OF THE INVENTION

In electronic circuits having a plurality of subcircuits that are intercoupled by a logic bus or logic busses, address and data information is coupled among the subcircuits by clocked logic signals that are distributed over the logic bus or busses. Typically, most of the subcircuits are integrated circuits. A set of clocked logic signals is typically generated in one subcircuit of the electronic circuit by a set of transistor line drivers and distributed by the logic bus or busses to other subcircuits of the electronic circuit. Typically, the transistor drivers are designed having output characteristics such that the clocked logic signals are stabilized within a small fraction of a clock cycle, for example within 5 nanoseconds in a circuit that has a clock rate of 10 megahertz (a period of 100 nanoseconds). The other subcircuits, in combination with the logic bus to which the subcircuit generating the set of logic signals is connected, present a load to the set of transistor line drivers. This load in modern circuits is typically characterized as having a largely capacitive impedance. It is well known by those of ordinary skill in the art that the clock rate for distributing the clocked logic signals over such a logic bus is limited by the response time of the bus, which is determined by the capacitive load presented by each subcircuit being driven by the subcircuit generating the set of logic signals, and by the amplification, or drive, characteristics of the set of transistor amplifiers in the subcircuit generating the set of logic signals, and by the impedance of the bus. Such bus interconnected circuits generate electromagnetic interference (EMI) at radio frequencies. It is also well known to one of ordinary skill in the art, for a given set of receiving subcircuits and a given physical layout of a bus, that as the rate of the clocked logic signal is increased the drive capability of the generating subcircuit must be increased, and that the energy of the EMI generally increases.

Bus interconnected electronic circuits currently in use sometimes include a plurality of busses to distribute a set of logic signals, in order to reduce the loading on output devices in the circuits driving the busses, thereby achieving a faster clocked logic signal rate. A plurality of such busses that distribute a common set of logic signals are described as cascaded busses. Typically, the states of the common set of logic signals coupled by the plurality of busses, whether internal busses (to an integrated circuit) or external busses (between integrated circuits), are changed essentially simultaneously. The simultaneous changing of the common set of logic signals in such a plurality of busses adds to the generation of EMI. The amount of EMI is also increased in many newer products by the use of wider logic busses. For example, while 8 bit wide busses were the dominant size used in small electronic devices ten years ago, 16 bit and 32 bit wide busses are much more prevalent today. All other conditions being equal, it will be appreciated that a 32 bit wide bus generates several times more EMI than an 8 bit wide bus.

Prior art electronic devices using bus interconnected subcircuits have successfully coped with the problem of increased bus loads by increasing the driving capability of the transistor amplifiers (by the use of larger transistors) to achieve high clock rates, and with the problem of EMI by providing shielding. Shielding has been typically accomplished by added metal parts and conductive coatings of the inside surface of equipment housings. However, the solution of using larger transistors adds cost to integrated circuits, and the solution of shielding adds cost and size to the electronic equipment using the bus interconnected subcircuits. Furthermore, larger transistor amplifiers increase the power drain. This is perhaps not so much a problem in many stationary, power line driven electronic devices. However, as more small, inexpensive, portable, battery powered electronic devices employ more complex, bus interconnected integrated subcircuits that also have internal busses, both large driver transistors and EMI shielding become larger problems.

Thus, what is needed is a technique of reducing the driver transistor size, the EMI emissions, and the power drain in electronic circuits that have bus interconnected subcircuits.

DETAILED DESCRIPTION OF THE DRAWINGS

Described herein below, is an apparatus for distributing clocked, bussed logic signals in an electronic circuit, using a unique technique of phasing the enablement of bus drivers of multiple cascaded busses, thereby substantially reducing the generation of electromagnetic interference and also substantially reducing the size of the driving transistors in comparison to prior art circuits. The method and apparatus can briefly be described as using alternative phases of a logic clock to enable the logic signal at subsequent bussed nodes, thereby allowing the line drivers to be very small, while allowing the logic signals to switch during the entire phase of the logic clock. In comparison, the bus drivers in prior art bussed circuits are typically sized much larger, in order to drive the switching of the logic states within a small fraction of the clock cycle. The phased timing and smaller device sizes also result in reduced power requirements compared to prior art circuits. In an electronic circuit that is in accordance with the present invention, the advantages described above can be attained at a cost of less than one clock cycle delay in transferring the bussed logic signals from a sending circuit to a receiving circuit.

Figure 1:
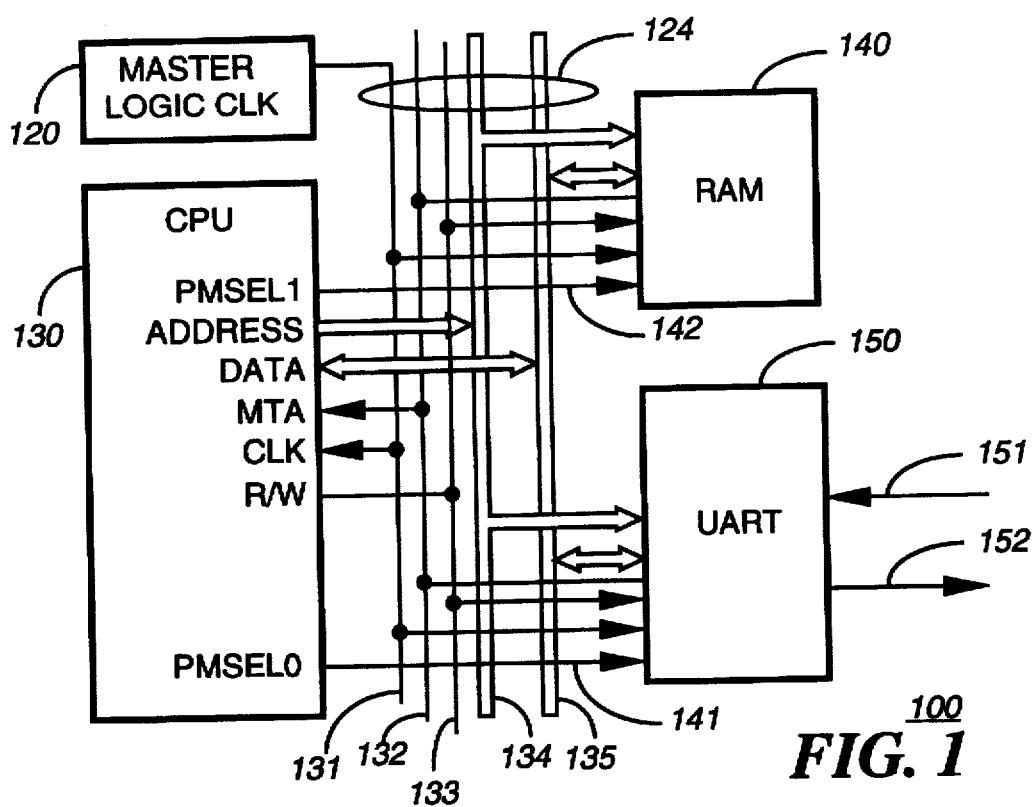
FIG. 1 is an electrical block diagram of an electronic circuit within which a set of bussed logic signals is distributed, in accordance with the preferred embodiment of the present invention.

Referring to FIG. 1, an electrical block diagram of an electronic circuit within which a set of bussed logic signals is distributed is shown, in accordance with the preferred embodiment of the present invention. The logic circuit comprises a master logic clock 120, a central processing unit (CPU) 130, a random access memory (RAM) 140, a universal asynchronous receiver transmitter (UART) 150, and a logic bus 124. The RAM 140, the CPU 130, and the UART 150 are circuit elements that can be either individual integrated circuits or may be combined into one integrated circuit. The RAM 140 provides conventional read/write storage of data. The UART 150 provides for conventional sending/receiving of serial data. The master logic clock 120 generates a clock signal 131 having a clock cycle with a clock period that is the reciprocal of the clock rate. The clock signal 131 is coupled on a common bus to the CPU 130, the RAM 140, and the UART 150, each of which receives the clock signal 131 and uses it as a reference to transmit or receive a set of address signals 134, a set of data signals 135, and other logic signals. The sets of address signals 134 and data signals 135 are preferably distributed at the clock rate, but may alternatively be distributed at a lower rate that is a sub-multiple (i.e., determined by an integral division) of the clock rate. The sets of address signals 134 and data signals 135 are bussed logic signals, which are coupled to the CPU 130, the RAM 140, and the UART 150. The set of address signals 134 is a set of 16 parallel bussed logic signals that are typically driven by the CPU 130 and received by the RAM 140 and the UART 150. The set of address signals 134 is also coupled to other bus connectable devices not shown in FIG. 1, for example, a read only memory 614 (shown in FIG. 5). The set of data signals 135 is a set of 32 parallel bussed logic signals that are driven either by the CPU 130, the RAM 140, or the UART 150 devices. The set of data signals 135 is also coupled to other bus connectable devices not shown in FIG. 1, for example, the read only memory 614 (shown in FIG. 5). A read/write (R/W) logic signal 133 is generated by the CPU 130 and coupled to the RAM 140, the UART 150, and other devices not shown in FIG. 1. The devices to which the set of data signals 135 is coupled, other than the CPU 130, are also known as peripheral modules. The CPU 130 generates peripheral module select signals (PMSELs) for devices to which data can be written or from which data can be read. Peripheral module select signal PMSEL0 141, which is coupled to the UART 150, and PMSEL1, which is coupled to the RAM 140, are illustrated in FIG. 1.

The set of address signals 134 typically conveys an address of a memory location within a device to which a set of data conveyed by the set of data signals 135 is written when the R/W signal 133 is in a write state and the peripheral module select signal associated with the device is in a select state. For example, a set of data is written to an address location within the RAM 140 determined by the set of address signals 134 while the R/W signal 133 is low and PMSEL1 is high (all other PMSELs are low). When data is to be received from a peripheral device such as the RAM 140 or the UART 150, the CPU 130 drives the R/W signal 133 high and the associated peripheral module select signal high. The peripheral device then drives the set of data signals 135 with a set of data logic levels. The above described functions of the set of address signals 134, the set of data signals 135, the R/W signal 133, and peripheral module select signals are typical of conventional bussed circuits. However, the driver circuits and the timing used to transmit, receive, and enable such logic signals are unique, as described more fully below.

In accordance with the preferred embodiment of the present invention, each peripheral module generates a unique module transfer acknowledgment signal (MTA) 132, which is coupled to the CPU 130. The use of this signal is more fully described below. Logic bus 124 comprises the set of address signals 134, the set of data signals 135, the clock signal 131, the R/W signal 133, and the MTA signal 132, which are distributed between the CPU 130 and the other devices.

It will be appreciated that in the electronic circuit 100 described herein, signals are typically described as having an active state or being asserted when the signal is in a logic high state, but that the signals could equally as well be active or asserted in the low state, as is well known to one of ordinary skill in the art.

Figure 2:
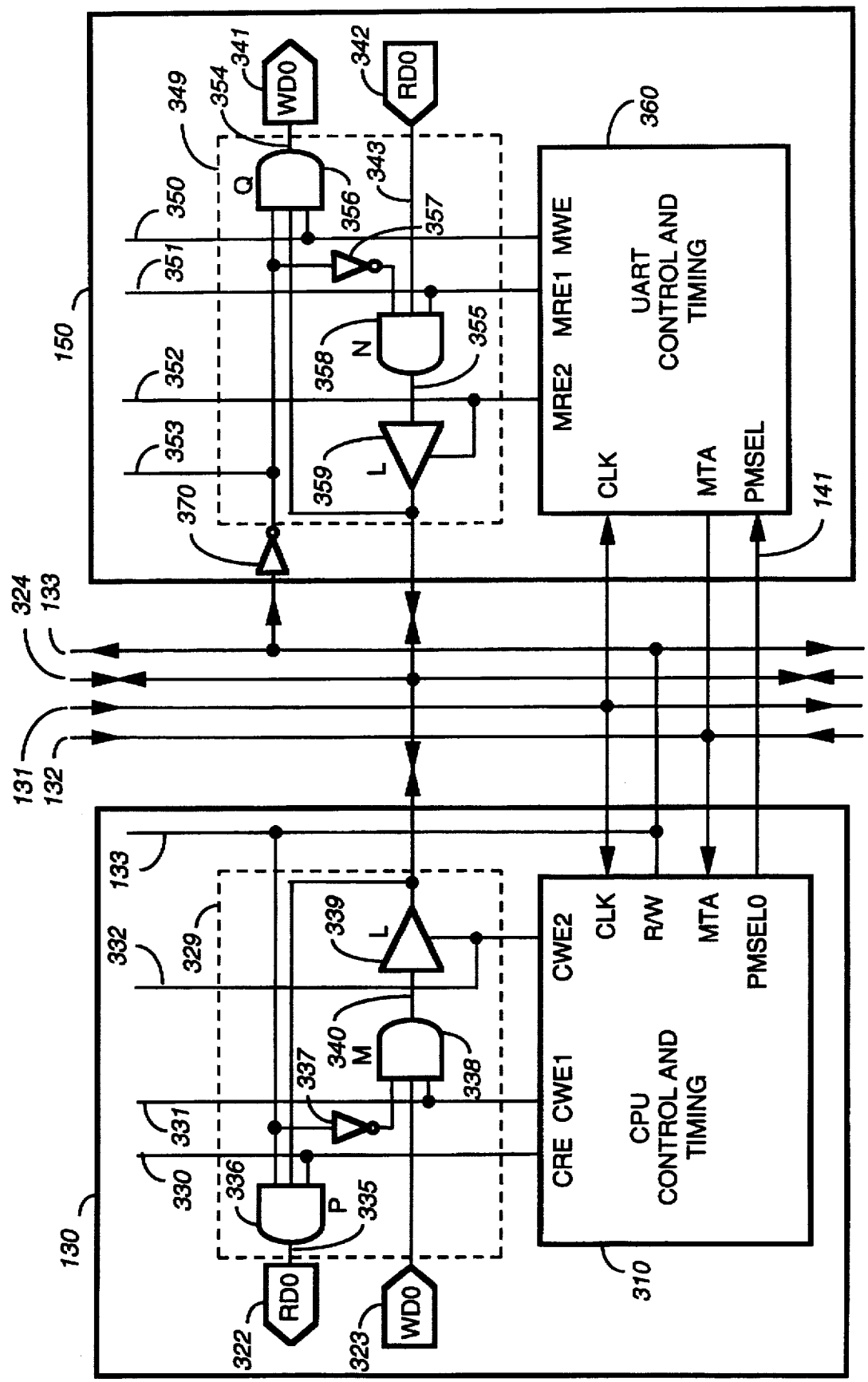
FIG. 2 is a logic diagram of a portion of the electronic circuit of FIG. 1 that includes a bussed data line and the drivers driving the data line, in accordance with the preferred embodiment of the present invention.

Referring to FIG. 2, a logic diagram of a portion of the electronic circuit of FIG. 1 which includes a bussed data line and the drivers driving the bussed data line is shown, in accordance with the preferred embodiment of the present invention. The CPU 130 and the UART 150 are shown in FIG. 2, along with a portion of the logic bus 124. The CPU 130 comprises a timing and control section 310, an internal set of replicated data interface stages 329, of which a first CPU data interface stage 329 is shown in FIG. 2, an internal data write source 323 associated with each data interface stage 329, of which the internal data write source (WD0) 323 coupled to the first CPU data interface stage 329 is shown, and an internal data read sink 322 associated with each data interface stage 329, of which the first internal data read sink (RD0) 322 coupled to the first CPU data interface stage 329 is shown. The internal data write source 323 is, for example, one stage of a parallel write data register into which data is loaded by a conventional write instruction executed by the CPU 130, and the first internal data read sink 322 is, for example, one stage of a parallel read data register into which data is loaded by a conventional read instruction executed by the CPU 130. The CPU 130 also comprises a set of address interface stages and typically comprises other circuit functions that are not shown in FIG. 2, and which are conventional functions, for example, an arithmetic logic unit.

The first CPU data interface stage 329 comprises an AND gate 336, an INVERTER 337, an AND gate 338, and a driver 339. The AND gate 336 is a bus receiver which is a three input AND gate with three signals coupled to the three inputs: a first data bus signal (DB0) 324, which is one of the set of bussed data signals 135, a CPU read enable (CRE) signal 330, which is generated by the CPU timing and control section 310, and the read/write (R/W) signal 133, which is also generated by the CPU timing and control section 310. When the R/W signal 133 is high (i.e., in the read state) and the CPU read enable signal 330 is high, the AND gate transfers the state of the DB0 signal to the output of the bus receiver 336, which is coupled to the first internal data read sink (RD0) 322.

The AND gate 338 is a three input AND gate with three signals coupled to the three inputs: a signal from the internal data write source for the first bit (WD0) 323, a first CPU write enable (CWE1) signal 331, which is generated by the CPU timing and control section 310, and an inverted read/write signal, which is coupled from the INVERTER 337. The INVERTER 337 has an input coupled to the R/W signal 133, which it inverts. When the R/W signal 133 is low (i.e., in the write state) and the CPU write enable signal (CWE1) 331 is high, the AND gate 338 transfers the state of the internal data source 323 to the output of the AND gate 338, which is coupled to a data input of the driver 339. The AND gate 338 has higher output drive capability than the typical AND gates used throughout the electronic circuit 100 for logic functions, and is also referred to as a driver, and more specifically as a pre-driver, since the output of the AND gate 338 is coupled to the driver 339. When the driver 339 is enabled by a high state of a second CPU write enable signal CWE2, which is generated by the CPU timing and control section 310, the driver 339 amplifies the signal coupled from the pre-driver gate AND gate 338, generating the first data bus signal (DB0) 324. The pre-driver AND gate 338 and driver 339 are also described respectively as a first driver and a second driver.

The signals CRE 330, CWE1 331, R/W 133, and CWE2 332 are coupled internally within the CPU 130 to each of the 32 data interface stages within the CPU 130, wherein each signal performs the same function within each stage simultaneously. Because the set of 32 bus receivers 336 are enabled simultaneously, the means used to couple the signals generated by the 32 bus receivers 336 to the internal data read sinks 322 form a CPU internal read bus 335. The means is typically a set of conductive metal lines, vias, solder joints, and/or other conventional circuit interconnection devices. Similarly, because the 32 three input AND gates 338 are enabled simultaneously, the means used to couple the signals generated by the 32 three input AND gates 338 to the drivers 339 form a CPU internal first write bus 340. Similarly, because the drivers 339 are enabled simultaneously, the means used to couple the signals generated by the 32 drivers 339 to other devices such as the UART 150 and the RAM 140 form an external logic bus 124, of which the first data bus signal (DB0) 324 is one line. The external logic bus 124 is typically interconnected to more devices than the internal busses. Consequently, the lengths of the interconnecting conductors are longer and the load caused by the lengths of the interconnecting conductors and the input impedances of the receiving devices is typically larger for the external bus 124 than the internal busses 335, 340.

The CPU timing and control section 310 generates the PMSEL0 signal 141, as well as PMSEL signals for other bus connected devices not shown in FIG. 2, such as the RAM 140, and receives the clock signal 131 and the MTA signal 132. The CPU timing and control section 310 generates the signals CRE 330, CWE1 331, R/W 133, CWE2 332, and the PMSEL signals 141, 142 to have timing characteristics which are determined by the clock signal 131, the MTA signal 132 and previous states of the CPU 130, as described below.

The UART 150 comprises a timing and control section 360, an INVERTER 370, an internal a set of replicated data interface stages 349, of which a first UART data interface stage 349 is shown in FIG. 2, an internal data read source 342 associated with each data interface stage 349, of which the first internal data read source (RD0) 342, which is coupled to the first CPU data interface stage 329, is shown, and an internal data write sink 341 associated with each data interface stage 349, of which the first internal data write sink (WD0) 341, which is coupled to the first CPU data interface stage 329, is shown. The first internal data read source 342 is, for example, one stage of a parallel receive data register into which data is loaded upon receipt by the UART 150 within the serial data signal 151, and the first internal data write sink 341 is, for example, one stage of a parallel transmit data register into which data is written from the CPU 130 for transmission in the serial data signal 152. The UART 150 also comprises a set of replicated address interface stages and typically comprises other circuit functions which are not shown in FIG. 2, and which are conventional functions, for example, first in, first out data word queueing registers. The INVERTER 370 inverts the R/W signal 133, generating an inverted signal 353 which is coupled to each of the UART data interface stages.

The first UART data interface stage 349 comprises an AND gate 356, an INVERTER 357, an AND gate 358, and a driver 359. The AND gate 356 is a three input AND gate with three signals coupled to the three inputs: the first data bus (DB0) signal 324, a module write enable (MWE) signal 350, which is generated by the UART timing and control section 360, and the inverted read/write (R/W) signal 353. When the inverted R/W signal 353 is high (i.e., in the write state) and the module write enable signal 350 is high, the AND gate 356 transfers the state of the DB0 signal 324 to the output of the AND gate 356, which is coupled to the first internal data write sink (WD0) 341.

The AND gate 358 is a three input AND gate with three signals coupled to the three inputs: a signal 343 (FIG. 2) from the first internal data read source (RD0) 342, a first module read enable (MRE1) signal 351, which is generated by the module timing and control section 360, and a read/write signal, which is coupled from the INVERTER 357. The INVERTER 357 has an input coupled to the inverted R/W signal 353, which it inverts. When the R/W signal 133 is high (i.e., in the read state) and the first module read enable signal MRE1 351 is high, the AND gate 358 transfers the state of the first internal data read source 342 to the output of the AND gate 358, which is coupled to a data input of the driver 359. When the driver 359 is enabled by a high state of a second module read enable signal MRE2 352, which is generated by the UART timing and control section 360, the driver 359 amplifies the signal coupled from the AND gate 358, generating the first data bus signal (DB0) 324 of the external logic bus 124.

The signals MWE 350, MRE1 351, inverted R/W 353, and MRE2 352 are coupled internally within the UART 150 to each of the 32 data interface stages within the UART 150, wherein they perform the same function within each stage simultaneously. For reasons analogous to those given in the above description of the CPU 130, the outputs of the 32 AND gates 356 are coupled by an internal write bus 354, and the outputs of the 32 three input AND gates 358 are coupled by an internal read bus 355. The outputs of the drivers 359 are coupled to the external logic bus 124, of which the first data bus signal (DB0) 324 is one of the set of data signals 135.

The UART timing and control section 360 receives the PMSEL0 signal 141 at an input for a module select signal (PMSEL), and the clock signal 131 at a clock input (CLK). The UART timing and control section 360 generates the signals MWE 350, MRE1 351, and MRE2 352 based on to the clock signal 131, PMSEL0 signal 141 and previous states of the CPU 130, as described below.

The pre-driver AND gates 338, 358, the drivers 339, 359, and the receivers 336, 356 have drive capabilities (output current handling and output impedance) determined by sizes of the output devices within the pre-driver AND gates 338, 358 and drivers 339, 359. The sizes are indicated respectively in FIG. 2 by the values M, N, L, L, P, and Q. The output devices of the pre-driver AND gates 338, 358, the drivers 339, 359, and the receivers 336, 356 typically have lower output impedance and higher drive capabilities than other internal logic gates and registers, such as the internal read data sources RD 342. Because the receivers 336, 356 drive internal data busses, they can be alternatively referred to as drivers.

It will be appreciated that although the first CPU data interface stage 329 and the first UART data interface stage 349 are shown for simplicity as having a single internal data write source (WD0), a single internal data read sink (RD0)

322, a single internal data write sink (RD0) 341, and a single internal data read source 342, each single source (or sink) can be one which is selected from multiple sources (or sinks) by techniques well known to one of ordinary skill in the art.

Figure 5:
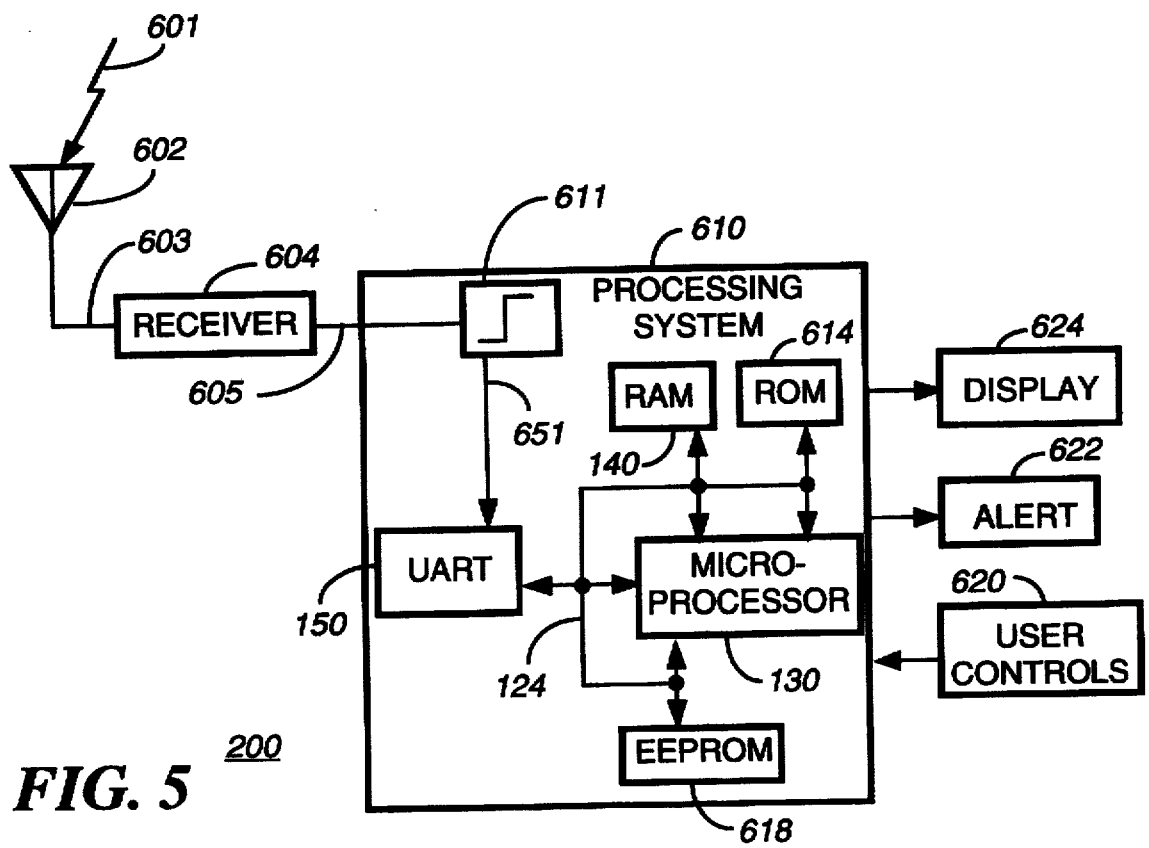
FIG. 5 is an electrical block diagram of a radio using the electronic circuit of FIG. 1, in accordance with the preferred embodiment of the present invention.

The first CPU data interface stage 329 and first UART data interface stage 349 in accordance with the preferred embodiment of the present invention differ from prior art bus driving and receiving circuits in aspects which are illustrated in FIG. 2 and described with reference to FIGS. 2, 4, and 5, and aspects which are described with reference to FIGS. 3 and 4. Aspects illustrated in FIG. 2 and described with respect to FIGS. 2, 4 and 5 are the sizes of the pre-driver AND gates 338, 358, drivers 339, 359, and receivers 336, 356. Aspects described with reference to FIGS. 3 and 4 are timing relationships of the signals MRE1 351, MRE2 352, and CRE 330, the timing relationships of the signals CWE1 331, CWE2 332, and MWE 350.

Figure 3:
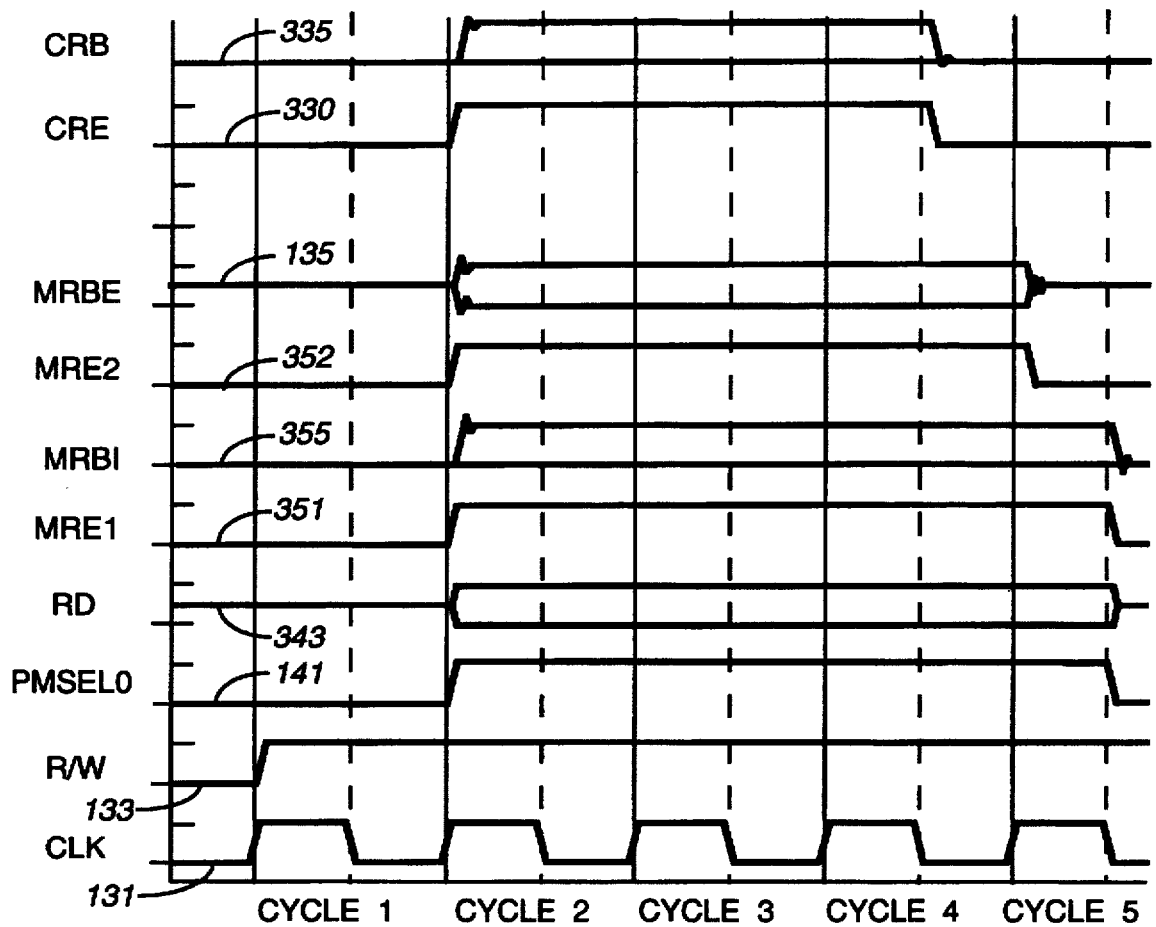
FIG. 3 is a timing diagram that illustrates the timing relationship of signals used in a prior art electronic circuit.
Figure 4:
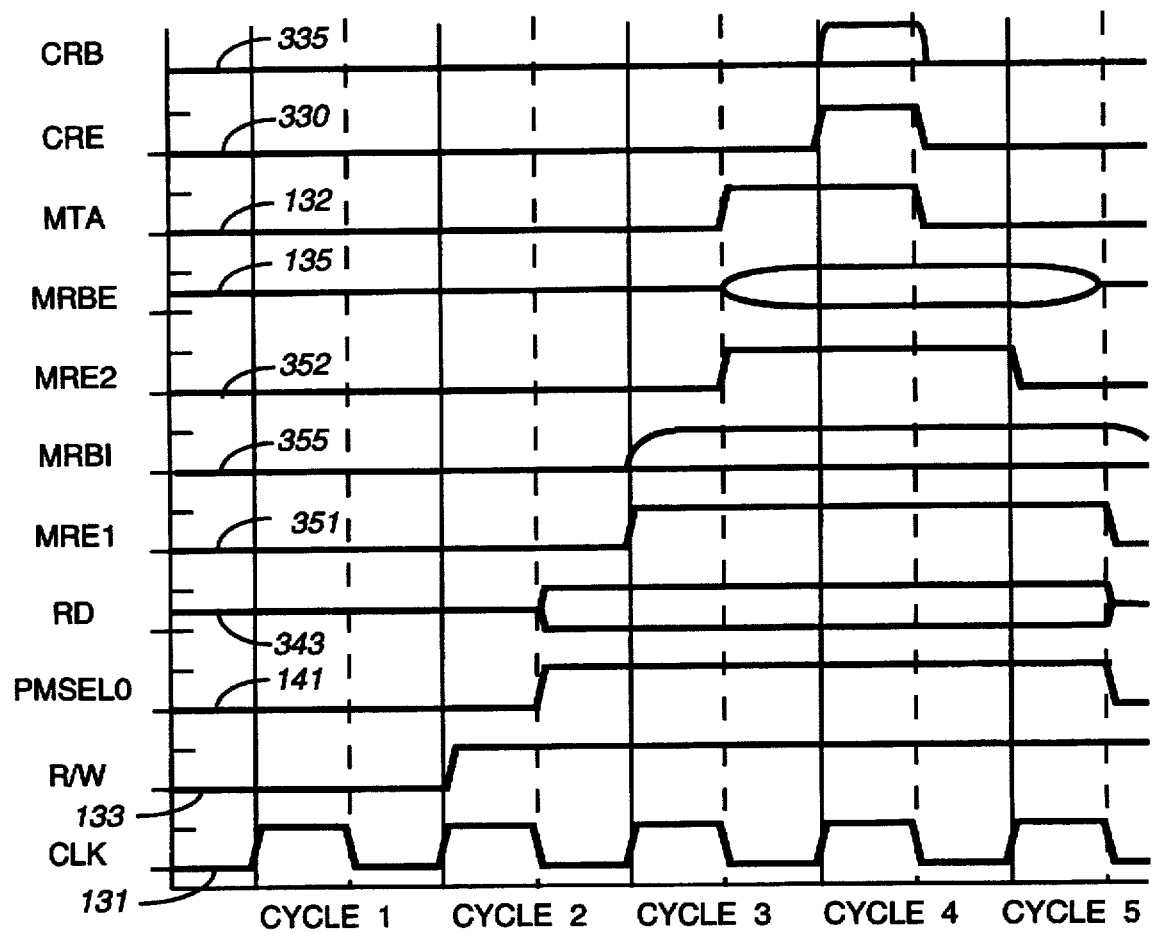
FIG. 4 is a timing diagram that illustrates the timing relationship of signals used in the electronic circuit of FIG. 2, in accordance with the preferred embodiment of the present invention.

Referring to FIG. 3, a timing diagram which illustrates the timing relationship of signals used in a typical prior art electronic circuit is shown. The signals shown in FIG. 3 represent signals in a prior art electronic circuit similar to electronic circuit 100 when a data word is read by the CPU 130 from the UART 150. The clock signal (CLK) 131 is shown at the bottom of FIG. 3, with five cycles identified on the horizontal axis. Evenly spaced solid vertical lines are spaced one clock period apart, as are evenly spaced dashed vertical lines. The vertical axis identifies a low and high voltage state for each signal. The clock signal (CLK) 131 is shown as the first signal at the bottom of FIG. 3, with five cycles identified at the horizontal axis. In the example illustrated in FIG. 3 a read operation is illustrated. The CPU 130 changes the R/W signal 133 to the read state (logic high, or high voltage) at the beginning of clock cycle 1, and then asserts PMSEL0 141 (changes it to a logic high) upon the beginning of clock cycle 2. The rise and fall times (transition times) of the clock signal 131, the R/W signal 133, the signals 343 from the internal data read sources 342, the enable signals MRE1 351, MRE2 352, and CRE 330, and the MTA signal 132 are indicated by slanted lines which over-exaggerate the actual transition times. For example, a typical clock period in an actual circuit is 100 nanoseconds, and a typical transition time varies from one to five nanoseconds, which is 1% to 5% of the clock period, or 2% to 10% of a half cycle phase of the clock signal 131. The UART timing and control section 360, upon receiving the asserted PMSEL0 141 at the PMSEL input, enables the outputs of the internal read data source registers RD, including RD0 342, which changes them from a tri-state output level to either a high or low logic state, as illustrated in FIG. 3. The UART timing and control section 360 simultaneously asserts the MRE1 signal 351 and MRE2 signal 352 at the beginning of clock cycle 2.

The assertion of the MRE1 signal 351 causes the pre-driver AND gate 358 and the other pre-driver AND gates driving the parallel lines of the internal bus 355 to change their output to a high state when the output an associated one of the RD registers 342 is high, but remain at the low state when the output of an associated one of the RD registers 342 is low. The outputs of the pre-driver AND gates 358 form a set of module read bus internal (MRBI) signals 355 having a waveform shown on the timing chart in FIG. 3. In a typical prior art circuit, the pre-drivers 358, which generate the MRBI bus signals 355, have a large output transistor size, N, compared to the output transistor devices used in other logic portions of the electronic circuit. The large output transistor size, N, is necessary to drive the internal bus so as to achieve a rapid stabilization of the output voltage. A pre-charge technique, well known to one of ordinary skill in the art, is used in some prior art electronic circuits in addition to the large output transistor size to achieve the rapid stabilization of the bus voltage. Because of the high drive levels used, the signals will typically overshoot before settling down to the steady state, or final voltages. The overshoot is illustrated at the leading edge of the MRBI waveform 355 illustrated in FIG. 3.

The pre-driver output signals MRBI 355 are coupled to the drivers 359, which amplify the set of MRBI signals 355 to drive the external logic bus 124 (shown in FIG. 1) with a set of data signals 135 (FIG. 1), alternatively described as module output bus external (MRBE) signals 135 (FIG. 3), of which set the MRBE0 signal 324 (FIG. 2) is one signal. Driver 359 in FIG. 2, like the other drivers 359 which drive the MRBE signals 135, amplifies the input signal, including some or all of the overshoot portion of the signal. The size, L, of the output driver transistors of the drivers 359, is typically even larger than the pre-driver 358 output driver transistors when, as in this example, each driver is sized to drive one of 32 data bus signals MRBE 135 which are more heavily loaded by lengths of the bussed conductors and the number of circuit elements connected to the logic bus than the MRBI signals 355. Consequently, the MRBE signals 135 typically exhibit even greater and more lengthy overshoot.

The driver output signals MRBE 135 are coupled to the bus receivers 336, which amplify the MRBE signals 135 to drive the CPU internal receiver bus 335 with CPU receive bus signals identified as CRB. The bus receivers 336 amplify the MRBE signals 135, which in the case illustrated in FIG. 2 is MRBE0 124 (also described above as DB0), including some or all of the overshoot portion of the signal. The size, P, of the output driver transistors of the bus receivers is typically somewhat larger than the output transistor devices used in other normal logic portions of the electronic circuit, although in some circuits, the size is the same as the size of output transistors used in the normal logic portions of the circuit, because the loading of the internal receiver bus 335 is significantly lower than that of the pre-driver bus 355 or external bus 135. The resultant CRB signals 335 exhibit a short enablement transition time, with small overshoot.

The bus signals MRBI 355, MRBE 135, and CRB 335 return to their inactive states when their respective enabling signals MRE1 351, MRE2 352, and CRE 330 change to the disabled states, as illustrated in the trailing edges of the signals at the right side of the timing charts. The MRBI 355 and MRBE 135 signals exhibit similar overshoot and ringing due to the relatively large transition currents and short transition times generated by the large output transistor sizes.

It will be appreciated that there are a variety of differing circuits used to couple bus logic signals, but that many of them which share the characteristic of driving a plurality of busses connected essentially in series (cascaded) use large output transistor devices in order to stabilize the signals in the plurality of the busses simultaneously within a small portion of the duration of a clock period.

Referring to FIG. 4, a timing diagram which illustrates the timing relationship of signals used in the electronic circuit of FIG. 2 is shown, in accordance with the preferred embodiment of the present invention. The signals shown in FIG. 4 represent signals in the electronic circuit 100 when a data word is read by the CPU 130 from the UART 150. The axes in FIG. 4 are the same as in FIG. 3. The clock signal (CLK) 131 is the first signal at the bottom of FIG. 4. In the example illustrated in FIG. 4 a read operation is again illustrated. The CPU 130 changes the R/W signal 133 to the read state (logic high) at the beginning of clock cycle 2, and then asserts PMSEL0 141 (changes it to a logic high) upon the beginning of the second half of clock cycle 2. As in FIG. 3, the transition times of the clock signal 131, the R/W signal 133, the RD signals 343 from the read data sources 342, the enable signals MRE1 351, MRE2 352, and CRE 330, and the MTA signal 132 are indicated by slanted lines which over-exaggerate the actual transition times. The UART timing and control section 360, in response to receiving the asserted PMSEL0 141 at the PMSEL input, enables the outputs RD 343 of the internal read data source registers 342, which changes them from a tri-state output level to either a high or low logic state at the beginning of the second half of clock cycle 2, as illustrated in FIG. 4. Also in response to receiving the asserted PMSEL0 141, the UART timing and control section 360 asserts the MRE1 signal 351 at the beginning of clock cycle 3 and the MTA signal 132 at the beginning of the second half of clock cycle 3. As in the typical prior art electronic circuit described with reference to FIG. 3, the assertion of the MRE1 signal 351 causes the predriver AND gates 358, to amplify the RD signals 343 coupled thereto, changing their outputs 355 to a high state when the output of the associated read data source 342 is high, but remaining at the low state when the output of the associated read data source 342 is low. Thus, the MRE1 signal 351 establishes an enablement period when it is high.

These changes of the internal bus signals MRBI 355 are enablement transitions of the signals 355. However, in contrast to the situation described above for a typical prior art electronic circuit, the timing of the enable signal MRE1 351 is such that the enablement transitions of the internal bus signals 355 occur during a first phase of the clock signal 131 which is the first half of the third clock cycle as shown in FIG. 4, and during which the external bus signals 135 and receiver bus signals 335 are not transitioning. Furthermore, the size, N, of the output transistors in the pre-driver gates 358 is minimized during the design process, so that the enablement transition times of the MRBI signals 355 are greater than 15 nanoseconds, and less than the first phase of the clock signal 131. When the transition times are greater than 15 nanoseconds, the amount of EMI generated is significantly reduced in comparison to the EMI generated by typical prior art circuit operating with transition times less than 5 nanosecond. The rise and fall times are defined, in a standard manner well known to one of ordinary skill in the art, as the time between the time when the signal reaches 10% of its final value and the time when it reaches 90% of its final value. It will be appreciated that when the transistor size is minimized as described, the enablement transition time of the MRBI signals 355 will typically be a substantial portion (30% or more) of the duration of the first phase, when the clock period is in the 50 to 100 nanosecond range typical of many of today's electronic circuits.

The pre-driver output signals MRBI 355 are coupled to the drivers 359. The UART timing and control section 360 asserts the MRE2 signal 352 at the beginning of the second half of clock cycle 3. By this time, the MRBI signals 355 have reached their stable values. When the MRE2 signal 352 is asserted, the drivers 359 amplify the MRBI signals 355 to drive the external logic bus 124 with module output bus signals identified as MRBE in FIG. 4. Thus, the MRE2 signal 352 establishes an enablement period when it is high. As in the case of the pre-drivers 358, the timing of the enable signal MRE2 352 is such that the enablement transitions of the external bus signals 135 occur during a second phase of the clock signal 131 which is the second half of the third clock cycle as shown in FIG. 4, and during which the internal bus signals 355 and receiver bus signals 335 are not transitioning, because the first and second phases are non-overlapping (that is, they are never in the active, high, state simultaneously). Furthermore, the size, L, of the output transistors in the driver gates 359 is minimized during the design process, so that the enablement transition times of the MRBE signals 135 are greater than 15 nanoseconds, and less than the second phase of the clock signal 131.

The driver output signals MRBE 135 are coupled to the bus receivers 336. In response to receipt of the asserted MTA signal 132, the CPU timing and control section 310 asserts the CRE signal 330 at the beginning of the next clock cycle, which is clock cycle 4. By this time, the MRBE 135 have reached their stable values. Thus, the CRE signal 330 establishes an enablement period when it is high. When the CRE signal 330 is asserted, the bus receivers 336 amplify the MRBE signals 135 to drive the CPU internal receive bus 335 with CPU receive bus signals identified as CRB 335. The loading on the receive bus is light, so that the enablement transition time at the leading edge of the MRBE signals 135 remains short without substantial ringing even though the size, P, of the output transistors of the receivers 336 are substantially the same as the size of the transistors used in the normal logic sections of the CPU 130 and UART 150. The CRB signals 335 are latched into the read data sinks RDO 322 during the first half of cycle four of the clock signal 131, which is a third phase of the cycle clock 131.

In response to the assertion of the MTA signal 132 at the beginning of the second half of cycle three, the CPU timing and control section 310 changes the CRE signal 330 to the unasserted state one clock period later, at the beginning of the second half of cycle four of the clock signal 131. In response to the change of CRE signal 330 to the unasserted state, the bus receivers 336 are disabled and the CRB signals 335 go to the logic low state with a transition time similar to the transition time at the leading edge of the CRB signals 335, which is less than a fourth phase of the clock signal 131. The fourth phase of the logic clock 131 is the second half of cycle four of the clock signal 131. At the beginning of second half of cycle four, the UART timing and control section 360 also changes the MTA signal 132 to its unasserted state. At the beginning of cycle five, the UART timing and control section 360 changes the MRE2 signal 352 to an unasserted state, in response to which the drivers 359 are disabled and the MRBE signals 135 go to the tri-state off state with a disablement transition time similar to the enablement transition time at the leading edge of the MRBE signals 135, which is greater than 15 nanoseconds, and less than a fifth phase of the clock signal 131. The fifth phase of the logic clock 131 is the first half of cycle five of the logic clock 131. At the beginning of the second half of cycle five, the UART timing and control section 360 changes the MRE1 signal 351 to an unasserted state, in response to which the pre-drivers 358 are disabled and the MRBI signals 355 go to the low state with a disablement transition time similar to the enablement transition time at the leading edge of the MRBI signals 355, which is greater than 15 nanoseconds, and less than a sixth phase of the clock signal 131. The sixth phase of the logic clock 131 is the second half of cycle five of the logic clock 131.

The disablement of the bussed signals MRBI 355, MRBE 135, and CRB 335 is accomplished during different, non-overlapping phases for the same reason as the enablements: to reduce EMI. The slow transition times of the more heavily loaded busses, MRBI 355 and MRBE 135 also act to reduce EMI. The smaller sizes, M, N, and L of the output transistors of the pre-drivers 338, 358 and the drivers 339, 359 reduces the size of the integrated circuits portions 130, 150.

It will be appreciated that the sets of internal and external bussed logic signals MRBI 355 and MRBE 135 are amplified during the periods in which the signals MRE1 351 and MRE2 352 enable the pre-drivers and drivers; there is no latching of the MRBI and MRBE signals 355, 135. The MRE2 352 and MRE1 351 enable the pre-drivers 359 until the CRB signals 335 are stabilized and latched (stored) in the CPU 130. Thus, the first enable period (that of MRE1 351) is greater than the duration of the first phase plus the duration of the second phase, and the second enable period (MRE2 352) is greater than the duration of the second phase. Similarly, the enable signals are unasserted in a phased manner to reduce the EMI by phasing the disablement of the signals which occurs when the enable signals are disabled. Accordingly, while the CRE signal 330 (a third enable period) has a duration which is essentially equivalent to the sum of the third and fourth phases of the logic clock signal 131, the MRE2 signal 352 (the second enable period) has a duration which is essentially equivalent to the sum of the second, third, fourth, and fifth phases of the logic clock signal 131, and the MRE1 signal 351 (the first enable period) has a duration which is essentially equivalent to the sum of the first, second, third, fourth, fifth and sixth phases of the logic clock signal 131. Thus, there are enablement phases and disablement phases which correspond to each of the enable periods established by the enable signals MRE1 351, MRE2 352 and CRE 330. It will be appreciated that the enablement signals 330, 352, and 351 could be longer. For example, if the CRB signals 335 were enabled for an additional clock cycle, all three enablement signals 330, 352, and 351 would have to be an additional clock cycle longer. The durations given above are minimum durations for enable signals which enable both the enablement transition times and the disablement transition times.

It will be further appreciated that the write circuit which includes the sets of pre-drivers 338, drivers 339, and receivers 356 are designed similarly to and exhibit similar characteristics during a write command as the read circuit, which includes the pre-drivers 358, the drivers 359, and the receivers 336, does during a read command (as described with reference to FIGS. 2, 3 and 4). The slow transition times of the waveforms and smaller size of the drivers 339, 359 and pre-drivers 338, 358 in accordance with the preferred embodiment of the present invention result in a rapid distribution of the bussed logic signals while generating significantly less EMI and reduced power than prior art circuits.

It will be further appreciated that the electronic circuit 100 in accordance with the preferred embodiment of the present invention reduces power consumption in comparison to prior art circuits, by not enabling and disabling receiving devices (e.g., the drivers 359 and receivers 336) until the bussed logic signals are stabilized, which reduces the switching current through the use of full rail operation. In comparison, typical prior art circuits such as the electronic circuit 100 described with reference to FIG. 3 enable and disable all receiving devices simultaneously. As a consequence, the receiving devices are driven from one rail to the other during the transition time of the input signal, which consumes more power.

It will be appreciated that while the duration of the phases as described above are equivalent and each is one half clock cycle, they may be established in alternative ways which would still afford the benefits described. For example, the duration of the phases could be determined to establish all the output devices at a same size. In this instance, the phase associated with the highest loaded bus would be longer. In this instance, the phases for three cascaded busses could have a duration ratio of 2:1:1. The phases can be any portion of a clock cycle (even greater than one cycle), and may, as in the description of the preferred embodiment, occur over a plurality of clock cycles. It will be further appreciated that the technique can be used with two cascaded busses or four or more cascaded busses, instead of the three described above.

It will be further appreciated that the coupling of bussed logic signals in the cascaded manner described herein will provide the benefits described herein in accordance with the preferred embodiment of the present invention whether the logic bus 124 is an external bus which interconnects circuit sections of separate integrated circuits such as the CPU 130, the UART 150, the master clock 120, and the RAM 140, or an external bus (that is, a bus between peripheral module sections) which interconnects sections of one integrated circuit.

The electronic circuit 100 in accordance with the preferred embodiment of the present invention, but designed for a different number of cascaded busses than described herein with reference to FIGS. 2, 3, and 4, can be generically described to include a plurality of circuit elements (e.g., CPU 130, RAM 140, UART 150) to which a set of bussed logic signals generated by a first circuit element (e.g., the set of signals 343 generated by the internal read data sources 342) is distributed at a clock rate determined by a logic clock (e.g., logic clock 120) having a clock cycle with a clock period that is a reciprocal of the clock rate. The electronic circuit further includes a plurality of cascaded busses (e.g., internal bus 355, external bus 124, internal bus 335) including a last cascaded bus (e.g., internal bus 335) having a last enablement phase (e.g., the third phase described with reference to FIG. 4) of the logic clock that corresponds to the last cascaded bus. Each of the plurality of cascaded busses couples a set of amplified logic signals (e.g., MRBI 355, MRBE 135, CRB 335) from one of the plurality of circuit elements (e.g., respectively, the set of pre-drivers 358, the set of drivers 359, and the set of receivers 336) to another one of the plurality of circuit elements (e.g., respectively, the set of drivers 359, the set of receivers 336, and the set of read data sinks 322).

The set of amplified logic signals of each of the plurality of cascaded busses is enabled during a corresponding enable period (e.g., MRE1 351, MRE2 352, CRE 330) which lasts beyond an end of the last enablement phase (e.g., the third phase) associated with the last cascaded bus. A maximum rise time of at least one of the set of amplified logic signals (e.g., MRBI 355) is substantially equivalent to a duration of the corresponding phase (e.g., the first phase) which occurs during the corresponding enable period. Each of the plurality of cascaded busses is coupled to a corresponding set of drivers (e.g., pre-drivers 358, drivers 359, receivers 336) which generates the set of amplified signals from the set of bussed logic signals coupled through one or more of the plurality of circuit elements (e.g., the set of pre-drivers 358, the set of drivers 359, the set of receivers 336). A size (e.g., L) of at least one of the corresponding set of drivers (e.g., the drivers 359) is minimized such that the maximum rise time of the set of amplified logic signals (e.g., MRBE 135) is a substantial portion of a duration of the corresponding enablement phase (e.g., the second phase). Each of the plurality of cascaded busses (e.g., MRBI 355, MRBE 135, CRB 335) is associated with a corresponding disablement phase of the logic clock (e.g., the fourth, fifth, or sixth phase)

which is greater than a corresponding disablement transition time. Each of the corresponding enable periods is greater than a sum of the enablement phase and disablement phase corresponding to it, plus the sum of the enablement phase and disablement phase corresponding to all previous cascaded busses.

There is no overlap of any corresponding enablement phase and corresponding disablement phase; in other words, no portion of any enablement or disablement phase occurs simultaneously with any other enablement or disablement phase.

Alternatively, the electronic circuit 100 in accordance with the preferred embodiment of the present invention is generically described as an electronic circuit within which a set of bussed logic signals (e.g., the set of signals 343 generated by the internal read data sources 342) is distributed at a clock rate determined by a logic clock (e.g., logic clock 120) having a clock cycle with a clock period that is a reciprocal of the clock rate. The electronic circuit includes a set of first drivers (e.g., pre-drivers 358), a set of second drivers (e.g., drivers 359), a first bus (e.g., internal bus 355), a set of bus receivers (e.g., receivers 336), and a second bus (e.g., external bus 124). The set of first drivers generates a set of first amplified logic signals (e.g., MRBI 355) having a first enablement transition time during a first enable period (e.g., MRE1 351) by amplifying a corresponding set of logic signals (e.g., logic signals 343). The first bus couples the set of first amplified logic signals to the set of second drivers. The set of second drivers amplifies the set of first amplified logic signals during a second enable period (e.g., 352), generating a set of second amplified logic signals (e.g., MRBE 135) having a second enablement transition time. The second bus couples the set of second amplified logic signals to the set of bus receivers. The first enable period is greater than the first enablement transition time plus the second enablement transition time, and the second enable period is greater than the duration of the second enablement transition time. A size (e.g., N) of at least one of the set of first drivers and the set of second drivers (e.g., the first set of drivers) is minimized such that an enablement transition time of a corresponding at least one of the set of first amplified logic signals and the set of second amplified logic signals (e.g., the set of first amplified logic signals) is a substantial portion of a duration of a corresponding phase of the logic clock (e.g., the first half of the third clock cycle).

Referring to FIG. 5, an electrical block diagram of a radio 600 is shown, in accordance with the preferred and alternative embodiments of the present invention. The radio 600 is a selective call radio that includes an antenna 602 for intercepting a radiated signal 601. The antenna 602 converts the radiated signal to a conducted radio signal 603 that is coupled to a conventional receiver 604 wherein the conducted radio signal 603 is received in a conventional manner. The receiver 604 generates a demodulated signal 605 that is coupled to a processing section 610. The processing section 610 is coupled to a display 624, an alert 622, and a set of user controls 620. The processing section 610 comprises a microprocessor 130 that is coupled to a universal asynchronous receiver transmitter (UART) 150, a random access memory (RAM) 140, a read only memory (ROM) 614, and an electrically erasable programmable read only memory (EEPROM) 618. The processing section 610 further comprises a signal squaring circuit 611 that is coupled to the demodulated signal 605 and the UART 150. The signal squaring circuit 611 is a conventional signal shaping circuit that generates data symbols, preferably binary symbols, from the demodulated signal 605, which are coupled to the UART 150, wherein they are converted to parallel data words and coupled to the microprocessor 130 by the parallel logic bus 124 as described above with reference to FIG. 1.

A message processor function decodes outbound words and processes an outbound message when an address received in the address field of the outbound signaling protocol matches an embedded address stored in the EEPROM 618, in a manner well known to one of ordinary skill in the art for a selective call radio 600. An outbound message that has been determined to be for the selective call radio 600 by the address matching is processed by the message processor function according to the contents of the outbound message and according to modes set by manipulation of the set of user controls 620, in a conventional manner. An alert signal is typically generated when an outbound message includes user information. The alert signal is coupled to the alert device 622, which is typically either an audible or a silent alerting device.

When the outbound message includes alphanumeric or graphic information, the information is displayed on the display 624 in a conventional manner by a display function at a time determined by manipulation of the set of user controls 620.

The master logic clock 120 (shown in FIG. 1, but not in FIG. 5), the EEPROM 618, RAM 140, the ROM 614, and the UART 150 are unique parts which are similar to conventional parts except for unique timing and control sections (e.g., 310, 360 shown in FIG. 2) which generate unique timing of bus enabling signals, unique bus pre-drivers, drivers, and receivers. The ROM 614 has a conventional set of masked program instructions except for those which implement portions of the unique CPU timing and control section 310. Preferably, the microprocessor 130 is similar to a conventional processor of the 68HC11 family manufactured by Motorola, Inc., except for portions of the microprocessor that perform functions of the unique timing and control section 310. It will be appreciated that other processors can be modified for use as the microprocessor 130, and that additional processors of the same or alternative type can be added as required to handle the processing requirements of the processing section 610. It will be appreciated that other types of memory, e.g., ultraviolet erasable programmable read only memory (UVEPROM) or flash ROM with the unique modifications described above, can be alternatively utilized for the ROM 614, as well as the RAM 140. It will be further appreciated that the RAM 140, the EEPROM 618 and the ROM 614, singly or in combination, can be integrated as a contiguous portion of the microprocessor 130.

By now it should be appreciated that there has been provided a electronic circuit having bussed logic signals which provides reduction of EMI, reduces power requirements, and reduces the size of the circuit in comparison to prior art electronic circuits having bussed logic signals by using phased enablement signals and small sized output transistor devices in the bus drivers. The sizes of the output transistor devices are minimized so as to generate maximum transition times of the bussed logic signals that have a duration that is a substantial portion of the duration of a non-overlapping phase of the logic clock.

We claim:

1. An electronic circuit capable of reducing electromagnetic interference, within which a set of bussed logic signals is distributed by a logic clock having a clock cycle and a clock period, comprising:

a set of first drivers which generates a set of first amplified logic signals having a first enablement transition time during a first enable period by amplifying a corresponding set of logic signals coupled thereto;

a set of second drivers;

a first bus which couples the set of first amplified logic signals to said set of second drivers, wherein said set of second drivers amplifies said set of first amplified logic signals during a second enable period, generating a set of second amplified logic signals having a second enablement transition time;

a set of bus receivers; and a second bus which couples said set of second amplified logic signals to said set of bus receivers, wherein the first enable period is greater than the first enablement transition time plus the second enablement transition time, and the second enable period is greater than the second enablement transition time, and wherein a size of at least one of said set of first drivers and said set of second drivers is minimized such that an enablement transition time of a corresponding at least one of the set of first amplified logic signals and the set of second amplified logic signals is a substantial portion of, but does not exceed, a duration of a corresponding phase of the logic clock.

2. The electronic circuit according to claim 1, wherein the enablement transition time is greater than 15 nanoseconds and less than the corresponding phase of the logic clock.

3. The electronic circuit according to claim 1, wherein the corresponding phase of the logic clock is one of a quarter cycle and a half cycle of the logic clock.

4. The electronic circuit according to claim 1, wherein the electronic circuit is a single integrated circuit.

5. An electronic circuit capable of reducing electromagnetic interference, within which a set of bussed logic signals is distributed by a logic clock having a clock cycle and a clock period, comprising:

a set of first drivers which generates a set of first amplified logic signals having a first enablement transition time during a first enable period by amplifying a corresponding set of logic signals coupled thereto;

a set of second drivers;

a first bus which couples the set of first amplified logic signals to said set of second drivers, wherein said set of second drivers amplifies said set of first amplified logic signals during a second enable period, generating a set of second amplified logic signals having a second enablement transition time;

a set of bus receivers; and a second bus which couples said set of second amplified logic signals to said set of bus receivers.

wherein the first enable period is greater than the first enablement transition time plus the second enablement transition time, and the second enable period is greater than the second enablement transition time, and wherein the first enablement transition time occurs during a first phase of the logic clock which is during the first enable period, and the second enablement transition time occurs during a second phase of the logic clock which is during the second enable period, and wherein the first and second phases are non-overlapping and each phase has a duration that exceeds the corresponding transition time.

6. The electronic circuit according to claim 5, wherein a duration of the first phase plus a duration of the second phase is less than or equal to the clock period.

7. The electronic circuit according to claim 5, wherein said set of bus receivers is enabled by a receive enable signal after an end of the second phase and the second enable period ends after said set of bus receivers is enabled.

8. The electronic circuit according to claim 5, wherein the set of first amplified logic signals have a first disablement transition time during the first enable period, and the set of second amplified logic signals have a second disablement transition time during the second enable period, and wherein the first enable period is greater than the first enablement transition time plus the second enablement transition time plus the first disablement transition time plus the second disablement transition time, and the second enable period is greater than the second enablement transition time plus the second disablement transition time.

9. The electronic circuit according to claim 8, wherein the second disablement transition time occurs during a third phase of the logic clock, and wherein the first disablement transition time occurs during a fourth phase of the logic clock, and wherein the first, second, third, and fourth phases of the logic clock are non-overlapping, and wherein the third phase and fourth phase each has a duration that exceeds the corresponding transition time.

10. The electronic circuit according to claim 5, wherein the enablement transition time is greater than 15 nanoseconds.

11. The electronic circuit according to claim 5, wherein the first phase and the second phase of the logic clock each have a duration of one of a quarter and a half cycle of the logic clock.

12. The electronic circuit according to claim 5, wherein the electronic circuit is a single integrated circuit.

13. An electronic circuit capable of reducing electromagnetic interference, comprising:

a plurality of circuit elements to which a set of bussed logic signals generated by a first circuit element is distributed by a logic clock having a clock cycle and a clock period; and a plurality of cascaded busses including a last cascaded bus having a last enablement phase corresponding thereto, wherein each of said plurality of cascaded busses couples a set of amplified logic signals from a previous one of the plurality of circuit elements to a next one of the plurality of circuit elements, and wherein said set of amplified logic signals of each of said plurality of cascaded busses is enabled during a corresponding enablement phase of an enable period, wherein the enable period lasts beyond an end of the last enablement phase, and wherein an enablement transition time of at least one of the set of amplified logic signals is a substantial portion of a duration of a corresponding enablement phase which occurs during the corresponding enable period, and wherein no corresponding enablement phase overlaps another corresponding enablement phase.

14. The electronic circuit according to claim 13, wherein each of said plurality of cascaded busses is coupled to a corresponding set of drivers which generates the set of amplified logic signals from the set of bussed logic signals coupled through one or more of the plurality of circuit elements, and wherein a size of at least one of said corresponding set of drivers is minimized such that the enablement transition time of the set of amplified logic signals is the substantial portion of the duration of the corresponding enablement phase.

15. The electronic circuit according to claim 14, wherein the substantial portion of the duration of the corresponding enablement phase is greater than 15 nanoseconds and less than the duration of the corresponding enablement phase.

16. The electronic circuit according to claim 13, wherein
each of the plurality of cascaded busses is associated with a corresponding disablement phase of the logic clock which is greater than a corresponding disablement transition time, and wherein each of said corresponding enable periods is greater than a sum of the enablement phase and disablement phase corresponding thereto plus the sum of the enablement phase and disablement phase corresponding to all previous cascaded busses, and wherein there is no overlap of any corresponding enablement phase and corresponding disablement phase.

17. A radio comprising the electronic circuit of claim 2.

18. A radio comprising the electronic circuit of claim 5.

* * * * *